United States Patent [19]

Kocsis et al.

[11] Patent Number: 4,464,504

[45] Date of Patent: Aug. 7, 1984

[54] FREON-CORROSION, IMPACT AND COLD RESISTANT FLAME-RETARDANT POLYSTYRENE BLEND CONTAINING ZEOLITES HAVING CATION(S) OF MG, CO, SB, OR MO

[75] Inventors: József K. Kocsis; László Kiss; Zoltán Balajthy; Peter Nagy; Gizella Pái nee Hazkotó, all of Budapest; Miklós Zarubai, Jaszbereny; Géza Sipos, Jaszbereny; András Romhányi, Jaszbereny; Rudolf Kókai, Jaszbereny, all of Hungary

[73] Assignee: Müanyagipari Kutató Intézet and Hütogépgyár, Budapest, Hungary

[21] Appl. No.: 468,588

[22] Filed: Feb. 22, 1983

[30] Foreign Application Priority Data

Feb. 22, 1982 [HU] Hungary ................. 521/82

[51] Int. Cl.$^3$ ................................................ C08K 3/10
[52] U.S. Cl. ................................. 524/443; 524/444;
524/450; 524/505; 525/96; 525/98; 525/99
[58] Field of Search ............... 524/444, 450, 505, 443;
525/98, 99, 96

[56] References Cited

U.S. PATENT DOCUMENTS

| | | | |
|---|---|---|---|
| 3,245,946 | 4/1966 | O'Connor | 524/450 |
| 3,873,645 | 3/1975 | Muirhead et al. | 524/505 |
| 4,133,795 | 1/1979 | Himes | 524/505 |
| 4,148,771 | 4/1979 | Nash | 524/505 |
| 4,267,283 | 5/1981 | Whitehead | 525/89 |

FOREIGN PATENT DOCUMENTS

| | | | |
|---|---|---|---|
| 116743 | 9/1980 | Japan | 524/505 |
| 120641 | 9/1980 | Japan | 524/450 |
| 131034 | 10/1980 | Japan | 524/505 |
| 34143 | 2/1982 | Japan | 524/450 |
| 1092600 | 11/1967 | United Kingdom . | |

OTHER PUBLICATIONS

Chem. Abs. 86-30436-(1977) Tanaka et al.
Chem. Abs. 94-48633-(1981) Nippon 80JP-120641.
Chem. Abs. 96-219112-(1982) Nippon 82-034142.
Chem. Abs. 89-60837 (1978) Miki et al., 78JP-10618.
Chem. Abs. 75-37545 (1971) Sintsoua et al.
Chem. Abs. 71-113898 (1969) Blokh et al.
Chem. Abs. 68-22458 (1968) Tokyo Shibaura.

*Primary Examiner*—Herbert J. Lilling
*Attorney, Agent, or Firm*—Keil & Weinkauf

[57] ABSTRACT

The invention relates to a blend, based on polystyrene and/or impact resistant polystyrene, which is stress-corrosion, impact and cold resistant and flame retardant.

The blend according to the invention contains 50 to 98 mass % of polystyrene or impact resistant polystyrene, 0.01 to 15 mass % of zeolites with a pore size above 0.43 nm, 2 to 18 mass % of a styrene/butadiene block copolymer, 0 to 15 mass % of a flame retardant and 0 to 2 mass % of a surface-active agent.

The properties of the blend can be adjusted between wide limits by a suitable selection of the quality and quantity of the components.

The blend can be prepared by the processors themselves, whereby the selection of the available polystyrene types can be considerably increased.

4 Claims, No Drawings

FREON-CORROSION, IMPACT AND COLD RESISTANT FLAME-RETARDANT POLYSTYRENE BLEND CONTAINING ZEOLITES HAVING CATION(S) OF MG, CO, SB, OR MO

The invention relates to a blend based on polystyrene or impact-resistant polystyrene, the said composition being freon-corrosion, impact and cold resistant as well as flame-retardant.

It is known that the polystyrene is extremely inclined to stress cracking and stress corrosion in numerous chemical media whereby its applicability is reduced to an extraordinarily high degree. Its usability is furthermore restricted by the facts that its impact resistance especially at low temperatures is extremely low and it is a flammable material: it is easy to ignite and a high quantity of smoke is formed at its burning.

In order to improve the cold and impact resistance of polystyrene, high impact strength polystyrene grades (toughened polystyrenes) were developed. These polystyrene types are mostly obtained by the polymerization of the styrene monomer in the presence of styrenic solution of polybutadiene or another similar rubber. Toughened polystyrene can be produced also via mechanochemical synthesis by masticating the polystyrene with a properly chosen impact modifier rubber. From the mechanochemical synthesis leading to a chemical bond between the components those methods can be separated at which the improvement of the impact resistance of the polystyrene is achieved by melt blending of suitable additives, thereby forming blends or "alloys". For such purpose block copolymers based on styrene/butadiene thermoplastic rubbers of different chemical structure (of formulas SBS, SBSB, /SB/$_3$X, /SB/$_4$X, /SB/$_n$, wherein S represents polystyrene and B stands for polybudatiene chains, X is a cross-linking point of covalent bond and n refers to the multiple repetition of the segments) are suitable. Such impact modifiers are described e.g. in the published Japanese application No. 78,60,950.

A method is known, too, where the polystyrene is modified by a master batch containing even other additives, such as ethylene/propylene copolymers, beside the styrene-butadiene block copolymers (published German patent application No. 2,839,357).

For reducing the flammability of polystyrene compounds containing halogens, mainly the mixture of bromated aromatic hydrocarbons and $Sb_2O_3$ (see e.g. the published Japanese application No. 75,108,344) are used: besides, other inorganic additives, such as asbestos (published Japanese application No. 77,127,958), $Mg(OH)_2$ (published Japanese application No. 78,88,052) may be used, too. Beside the method applying the above "additive" flame retardants processes are known, too, wherein reactive flame retardants are used, that is the styrene is copolymerized with halogenated styrene derivatives.

Accordingly, the impact resistant and flame-retardant polystyrene types contain polystyrene, impact-modifiers and flame-retardants.

The tendency of polystyrene to environmental stress cracking is generally reduced by a suitable regulation of the block or suspension polymerization of the styrene in the presence of an impact-modifier rubber, whereby the impact modifier appears in a well determined average particle size and in an advantageous particle-size distribution (German patent specification No. 2,525,019).

Presumably in order to ensure an appropriate particle size distribution a copolymerization technology is applied, too, wherein a monomer which is well-compatible with the polystyrene is grafted on the impact modifier (published German application No. 2,713,258).

From the literature it is known that the toughness of the impact resistant polystyrene and its tendency to cracking depend to a high degree—among others—on the average particle size and particle size distribution of the distributed impact modifier, furthermore on the rubber-matrix adhesion (Dinges, K.: Kautschuk, Gummi, Kunststoffe, 32, 748 /1979/).

In the production of refrigerators the inner chamber of the refrigerator is mostly isolated by polyurethane foamed by freon gas (hydrocarbons containing Cl and F). No polystyrene type is known which could resist to a greater extent the stress corrosion caused by the freon and, in addition to this, would be sufficiently cold and impact resistant. Presently polystyrenes of increased stress corrosion resistance are used for this purpose. Though impact resistant and flame-retardant polystyrene types have been elaborated, no polystyrene is known which could resist the stress corrosion caused by the chemical environment, first of all by freon gas.

From the above description of the prior art it is clear that stress corrosion resistant polystyrene types can be prepared only by extremely complicated copolymerization technologies.

The aim of the invention is to provide a blend which possesses increased stress-corrosion and within it freon-corrosion resistance and which can be prepared in a simple manner by melt blending of the components.

It is a further aim of the invention to provide a polymer blend based on polystyrene or impact-resistant polystyrene which is characterized, beside resistance to freon corrosion, by stress corrosion resistance to numerous chemical media, furthermore by increased cold and impact resistance as well as reduced combustibility.

A further aim of the invention is to provide a "tailer-made" blend the properties of which can be adjusted between wide limits by modifying the quantity and quality of the additives and which can be readily injection moulded and thermoformed.

The invention is based on the recognition that when thermoplastic butadiene/styrene block copolymers and zeolites (molecular sieves) having a pore size exceeding 0.43 nm are used together—from time to time in the presence of surface-active agents and flame-retardants—for modifying the polystyrene and/or the impact resistant polystyrene, a blend can be obtained which is freon-corrosion, impact and cold resistant as well as flame-retardant.

The pore size of 0.43 nm can be present in the zeolite originally or may be established by chemical treatment.

Furthermore the invention is based on the recognition that by the cation-exchange of the zeolites the originally existing cations can be exchanged by cations which efficiently participate in the mechanism of flame retardation.

These recognitions are surprising for a person skilled in the art because according to the known art it cannot be expected that the partially or fully dehydrated zeolite is able to adsorb freon or chemical media producing stress corrosion and thus to reduce the stress corrosion of polystyrene and to inhibit and retard the transformation of cracks formed in polystyrene to fractures and catastrophic failure. On the other hand, zeolites are used for the dehydration of the cooling medium of adsorption refrigerators operating with freon (Breck, D. W.: Zeolite Molecular Sieves, Wiley-Interscience, New York, 1974, p. 704), and the chlorinated hydrocarbons are substances which are not adsorbed on zeolites (Breck, D. W.: Zeolite Molecular Sieves, Wiley-Interscience, New York, 1974, p. 17).

Furthermore, according to the prior art it is surprising that the zeolite itself participates in the reduction of combustibility and smoke evolution of polystyrene, and that this effect can be further increased by suitably changing the cations in zeolite by ion exchange, and by using it together with $Sb_2O_3$ and hydrocarbons containing halogen. These effects cannot be expected because the inner surface of the zeolites, ensured by the channels and cavities not accessible for the polymer chains where the majority of metal ions taking place in the mechanism of flame retardation can be found, is much larger than the outer surface of the zeolites surrounded by the polymer chains.

Accordingly, the blend of the invention comprises 50 to 98 mass %, preferably 80 to 97 mass %, advantageously 86 to 96 mass % of polystyrene and/or impact resistant polystyrene, 0.01 to 15 mass %, preferably 0.02 to 10 mass %, advantageously 0.05 to 5 mass % of zeolites with a pore size exceeding 0.43 nm, 2 to 18 mass %, preferably 2.5 to 10 mass %, advantageously 3 to 9 mass % of a styrene/butadiene block copolymer, 0 to 15 mass % of a flame retardant and 0 to 2 mass % of a surface-active agent.

According to the invention, beside the chemically etched variants the following zeolite types can be used: faujasite, mordenite of large port size, ofretite, furthermore synthetic molecular sieves of K, L, O, Ω, X and Y type as well as the variants brought into Mg, Co, Sb and Mo form by ion exchange thereof and of the chemically etched ones.

In the styrene/butadiene block copolymers the amount of the styrene in block form is preferably above 25 mass %. Hexa-, octa- or decabromo-diphenyl or -diphenyl-ether, hexabromo-benzene, pentabromo-toluene, hexabromo-cyclododecane, $Sb_2O_3$ and the mixtures thereof can be preferably used as flame retardants.

Fatty acids, metal salts of fatty acids, esters of fatty acids, alkyl-ammonium-halogenides, salts of benzene sulfonic acid can be preferably applied as surface-active agents.

The blend of the invention is suitably prepared in such a way that the components are melt blended generally at temperatures between 150° C. and 250° C. in a suitable equipment in an appropriate shear rate range ($10^1$ to $10^3$ $s^{-1}$). It is possible, however, to add to the polystyrene or the impact resistant polystyrene a previously prepared master batch which includes the components according to the invention. The mixture can be prepared even simultaneously with the processing of the mixture, in the processing machine itself.

The most important advantages of the blend according to the invention are as follows:

(a) It possesses an increased stress-corrosion and within it freon-corrosion resistance in relation to the starting polystyrene or impact resistant polystyrene.
(b) In comparison to the starting polystyrene or impact resistant polystyrene its cold and impact resistance is increased, its combustibility is decreased.
(c) It can be simply prepared, even by the processors.
(d) By a suitable choice of the quality and quantity of the additives, the physical, mechanical and thermal characteristics of the composition can be costume-tailored according to the purposes of the use between wide limits.
(e) The blend widens the available polystyrene types and renders possible the widening of the use of polystyrene.
(f) It can be prepared in the processing machine itself simultaneously with the processing and shaping.

The blend of the invention is illustrated in detail by the following non-limiting examples.

EXAMPLE 1

97 mass % of impact resistant polystyrene (number average molecule mass $M_n = 7.4 \times 10^4$, mass average molecular mass $M_w = 2.05 \times 10^5$) are admixed with 0.02 mass % of a molecular sieve of type X (MgX), brought into Mg-form in a manner known per se and dehydrated partially (drying at 250° C. for 20 minutes) and having a particle size smaller than 1 μm, and 2.8 mass % of a styrene/butadiene block copolymer of type SBS (on the basis of a calibration related to polystyrene, $M_n = 2.6 \times 10^4$, $M_w = 6 \times 10^4$, polystyrene in block form: 25 mass %). After mechanical admixing the components are homogenized for 5 minutes in a kneading chamber of W 50 EH type Brabender Plasti-Corder at an r.p.m. of 30, at a friction ratio of 1.5 at a temperature of 182° C. From the blend test pieces were prepared by hot pressing for the different tests. The characteristics of the blend—compared with those of the starting substance—are given in Table 1.

The stress corrosion resistance was always determined with a falling-dart impact test, in impact-bend (DIN No. 53,453), tensile (DIN No. 53,455) and bend tests (DIN No. 53,452) on test pieces prepared according to standard DIN No. 53,449. In contrast to standard DIN No. 53,449 the test results were not treated and given as a function of the ball oversize to establish the relative stress corrosion resistance but all tests were performed at a ball oversize of 0.12 mm, and the stress cracking resistance ($R_{ESC}$) was defined as the quotient of the values measured on test pieces stored in the given chemical medium and on specimens stored at a normal climate. The test pieces were stored in the given chemical medium for different periods, and the pieces serving for comparison and tested also at a ball oversize of 0.12 mm were stored at a normal climate for 48 hours.

The test results are shown in Table 1.

TABLE 1

| Test | Temperature °C. | Unit | Starting high impact resistant polystyrene (HIPS) | 97 mass % HIPS + 3 mass % SBS impact resistant additive | Composition according to Example 1 |
|---|---|---|---|---|---|
| Notched impact strength (DIN 53.453. small test pieces | −40 | kJ/m² | 2.1 | | 4.8 |
| | −20 | | 2.5 | | 5.2 |
| | 0 | | 2.7 | | 5.6 |
| $R_{ESC}$-value of samples stored in | 23 | — | 0.47 | 0.51 | 0.75 |

TABLE 1-continued

| Test | Temperature °C. | Unit | Starting high impact resistant polystyrene (HIPS) | 97 mass % HIPS + 3 mass % SBS impact resistant additive | Composition according to Example 1 |
| --- | --- | --- | --- | --- | --- |
| freon 11 (CCl$_3$F) for 2 hours and then allowed to stand for 22 hours, on the basis of the impact-bending test according to standard DIN 53,453 | | | | | |
| R$_{ESC}$-value of samples stored as described above, on the basis of ultimate elongation values obtained in the tensile test according to standard DIN 53.455 | 23 | — | 0.50 | 0.51 | 0.66 |
| Smoke evolution (light absorption, related value) ASTM D 2843 | | % | 100 | | 81 |
| Oxygen index ASTM D 2863 | | % | 17.9 | | 18.8 |

EXAMPLE 2

40 mass % of general purpose homopolystyrene (M$_n$=5.3×10$^4$, M$_w$=1.7×10$^5$), 15 mass % of impact resistant polystyrene (M$_n$=8.3×10$^4$, M$_w$=1.97×10$^5$), 5 mass % of chemically etched natural clinoptilolite brought into Sb-form (etched for 30 minutes with 2N HCl saturated with SbCl$_3$, then washed with water until free of ions, predried at 120° C. for 2 hours, then dehydrated at 300° C. for 1 hour), 5 mass % of chemically etched natural mordenite brought into Mo-form (etched as the clinoptilolite but the 2N HCl was saturated with MoCl$_2$), 5 mass % of molecular sieve NaY, 10 mass % of a styrene/butadiene thermoplastic block copolymer of type SBS (its characteristics are identical with those given in Example 1), 7 mass % of a styrene/butadiene thermoplastic block copolymer of type (SB)$_4$X (M$_n$=1.07×10$^5$, M$_w$=3.3×10$^5$, ratio of polystyrene in block form: 30 mass %), 8 mass % of decabromo-diphenyl, 4 mass % of Sb$_2$O$_3$ and 1 mass % of Mg-stearate were admixed and blended as described in Example 1.

The characteristics of the obtained mixture are given in Table 2.

TABLE 2

| Test | Temperature °C. | Unit | Composition according to Example 2 but containing HIPS instead of zeolites | Composition according to Example 2 but containing colloidal silica, instead of zeolites | Composition according to Example 2 |
| --- | --- | --- | --- | --- | --- |
| R$_{ESC}$-value of samples stored in heptane for 24 hours, then allowed to stand for 24 hours, on the basis of impact-bend tests according to standard DIN 53,453 | −40 | — | 0.63 | | 0.83 |
| | 0 | | 0.70 | | 0.85 |
| test according to the above conditions, but the storage was performed in the vapour of Freon 22 (CHClF$_2$) | −40 | — | 0.41 | | 0.71 |
| | 0 | | 0.42 | | 0.70 |
| Flammability OL-94 | | class | | V-1 | V-0 |

EXAMPLE 3

45 mass % of impact resistant polystyrene (its parameters are identical with those given in Example 2), 45 mass % of impact resistant polystyrene (M$_n$=8.9×10$^4$, M$_w$=2.56×10$^5$), 1.5 mass % of zeolite of type Y brought into Co- and Sb-form partially dehydrated (the ion exchange was carried out as described in Example 2, the 2N HCl was saturated with CoCl$_3$ and SbCl$_3$; dehydration was performed at 250° C. for 30 minutes), 1.5 mass % of dehydrated. (300° C., for 2 hours) zeolite MgL, 6 mass % of thermoplastic rubber of type (SB)$_4$X (M$_n$=7.5×10$^4$, M$_w$=1.83×10$^5$, polystyrene in block form: 40 mass %), 0.7 mass % of decabromo-diphenyl-ether and 0.3 mass % of trimethyl-cetyl-ammonium chloride were admixed and homogenized as described in Example 1.

The characteristics of the mixture are given in Table 3.

TABLE 3

| Test | Temperature °C. | Unit | Mixture of 50 mass % each of the starting impact resistant polystyrenes | Composition according to Example 3 |
| --- | --- | --- | --- | --- |
| Notched impact strength (DIN 53,453) | −40 | kJ/m$^2$ | 3.2 | 7.1 |
| | −20 | | 3.7 | 7.2 |

TABLE 3-continued

| Test | Temperature °C. | Unit | Mixture of 50 mass % each of the starting impact re-sistant poly-styrenes | Composition according to Example 3 |
| --- | --- | --- | --- | --- |
| $R_{ESC}$-value of samples stored in the vapour of freon 12 ($CCl_2F_2$) for 6 hours, then allowed to stand for 18 hours, on the basis of impact-bend test according to standard DIN 53,453 | 0 | — | 0.43 | 0.71 |
| $R_{ESC}$-value of samples stored in acetone for 24 hours, on the basis of the quotient of measured values of bending strength (DIN 53,452) | 23 | | 0.59 | 0.86 |
| Smoke evolution (light absorption relative value) ASTM D 2843 | | % | 100 | 84 |
| Oxygen index ASTM D 2863 | | % | 18.0 | 19.6 |

EXAMPLE 4

95 mass % of transparent, crystal-clear homopolystyrene ($M_n = 1.3 \times 10^5$, $M_w = 2.81 \times 10^5$), 0.5 mass % of dehydrated zeolite SbY with a particle size smaller than 0.1 μm (prepared as described in Example 2, dehydrated at 300° C. for 1 hour), 4 mass % of a butadiene/styrene based block copolymer of type SB ($M_n = 1.32 \times 10^5$, $M_w = 1.79 \times 10^5$, polystyrene in block form: 79 mass %) and 0.5 mass % of thermoplastic butadiene/styrene rubber of type $(SB)_4X$ (its characteristics are identical with those given in Example 2) were admixed and melt blended as described in Example 1.

The characteristics of the obtained translucent mixture are given in Table 4.

polystyrene of extrusion type, then the thus-obtained mixture was prehomogenized in a drum mixer and then processed to a sheet on a single-screw extruder. The impact-bending strength measured on test pieces prepared from the sheet at a temperature of −60° C. (DIN No. 53,453, notched Charpy bars) was about the twofold of that of the starting impact-resistant polystyrene, and its oxygen index exceeded by 1.2% that of the starting impact resistant polystyrene. The test pieces cut from the sheet were placed under mechanical stress at a ball oversize of 0.12 mm according to standard DIN No. 53,449 and stored in n-hexane and Freon 11, respectively, for 24 hours. Thereafter the breaking expansion value of the samples was measured and related to that of samples stored at normal climate ($R_{ESC}$). The results

TABLE 4

| Test | Temperature °C. | Unit | Starting polystyrene | Mixture according to Example 4 |
| --- | --- | --- | --- | --- |
| Notched impact strength of small Charpy bars (DIN 53,453) | −20 | $kJ/m^2$ | 2.0 | 4.1 |
| | 0 | | 2.0 | 4.8 |
| $R_{ESC}$-value of samples stored in acetone for 24 hours, on the basis of a test according to standard DIN 53,453 | 23 | | 0.49 | 0.82 |
| $R_{ESC}$-value of samples stored in the vapour space of Freon 12 for 24 hours, then allowed to stand for 24 hours, on the basis of breaking expansion values obtained in tests according to standard DIN 53,455 | 23 | | 0.37 | 0.76 |
| Oxygen index ASTM D 2863 | | % | 17.7 | 18.9 |
| Smoke evolution (light absorption relative value) ASTM D 2843 | | % | 100 | 90 |

EXAMPLE 5

A master batch of the following composition was prepared in a twine-screw mixing extruder rotating in one direction and having fitting wings:
- 10 mass % of homopolystyrene (its characteristics are identical with those given in Example 4)
- 70 mass % of butadiene/styrene thermoplastic rubber of type $(SB)_4X$ (its characteristics are identical with those given in Example 3)
- 15 mass % of a butadiene/styrene block copolymer of type SBS ($M_n = 2.6 \times 10^4$, $M_w = 4.6 \times 10^4$, polystyrene in block form: 27 mass %)
- 4.5 mass % of molecular sieve NaX
- 0.5 mass % of calcium-stearate.

The above master batch was added in form of granulates in a quantity of 10 mass % to an impact resistant clearly showed that the hexane corrosion resistance of the composition according to Example 5 was by 30% higher and its freon corrosion resistance by about 50 higher than that of the starting impact resistant polystyrene.

Practically identical results were obtained when the composition according to Example 5 was prepared in the processing machine itself, that is without preparing a master batch.

The impact resistance of the inner chambers of refrigerators thermoformed from the semi-finished sheet product, measured by falling dart impact test at −20° C., exceeded by 70-80% that of the inner chambers prepared from the starting impact resistant polystyrene.

What is claimed is:

1. A freon-corrosion, impact and cold resistant and flame-retardant polystyrene blend, comprising 50 to 98 mass % of polystyrene or impact resistant polystyrene,
  0.01 to 15 mass % of zeolites with a pore size above 0.43 nm,
  2 to 18 mass % of a styrene/butadiene block copolymer,
  0 to 15 mass % of a flame retardant and
  0 to 2 mass % of a surface-active agent,
  wherein the zeolites contain a cation of Mg—, Co—, Sb— or Mo—, such cation being introduced into the zeolite by ion exchange.

2. A blend as claimed in claim 1, comprising 80 to 97 mass % of polystyrene, 0.02 to 10 mass % of zeolites of a pore size above 0.43 nm and 2.5 to 10 mass % of a styrene/butadiene block copolymer.

3. A composition as claimed in claim 1, comprising 86 to 96 mass % of polystyrene, 0.05 to 5 mass % of zeolites and 3 to 9 mass % of a styrene/butadiene block copolymer.

4. A blend as claimed in claim 1, wherein the styrene content in block form of the styrene/butadiene block copolymer amounts to at least 25 mass %.

* * * * *